2,968,525
POTASH ORE TREATMENT

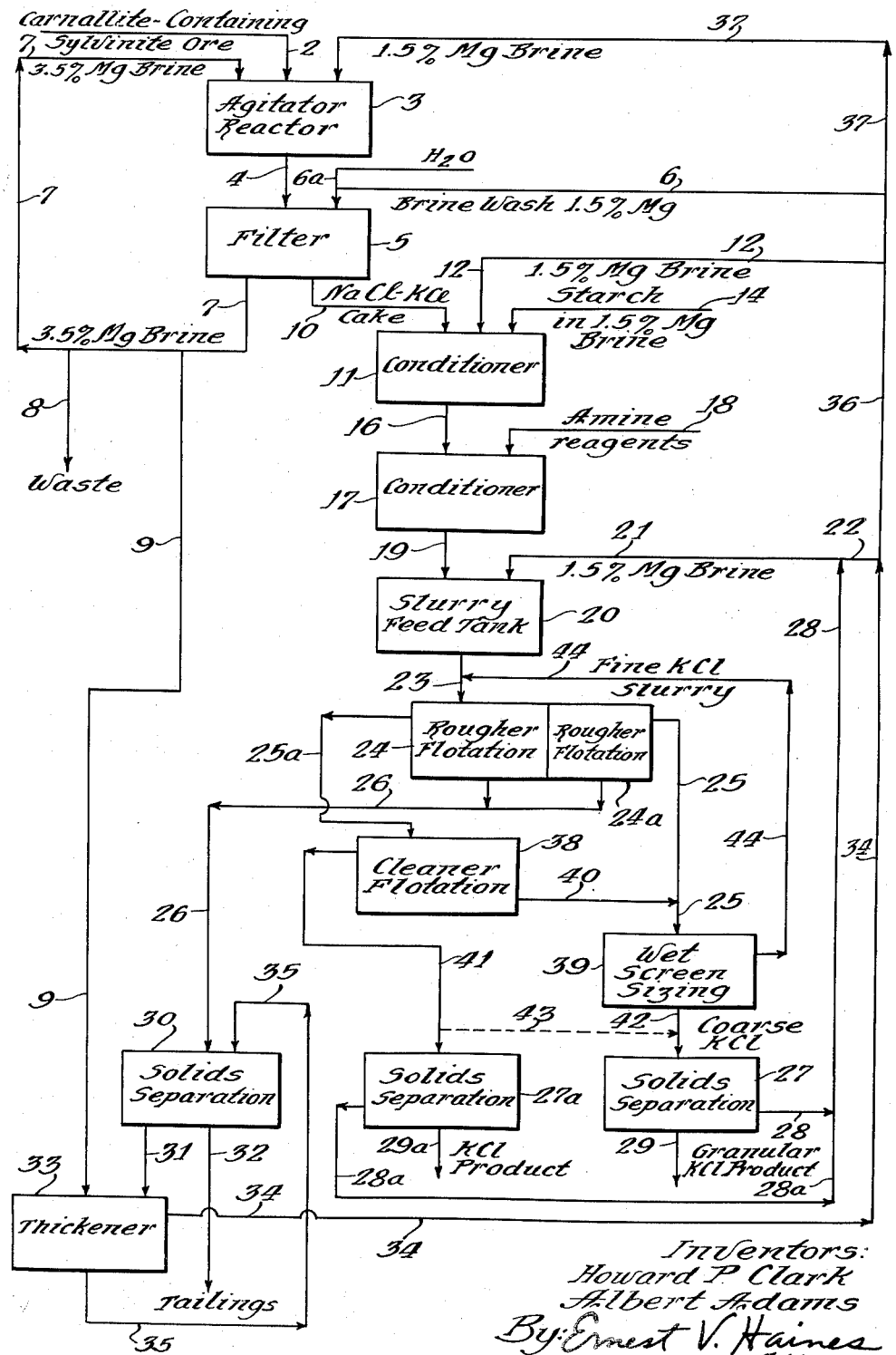

Howard P. Clark and Albert Adams, Carlsbad, N. Mex., assignors to International Minerals & Chemical Corporation, a corporation of New York Filed June 9, 1958, Ser. No. 740,963

7 Claims. (Cl. 23—38)

The present invention relates to a process of treating sylvinite which contains or is associated with carnallite for the purpose of rendering the treated ore amenable to the conventional beneficiation operations applied generally to sylvite ores. In certain sections of the North American and European continents sylvite ore (sylvinite) is found associated with significant amounts of carnallite. Ordinarily, such an ore, subjected to wet beneficiation operation, such as froth flotation, in a brine saturated with respect to the ore, will result in a sylvite concentrate containing susbtantially all of the carnallite originally present in the ore since the carnallite behaves about the same way as the sylvite in its reagentizing properties and, hence, collects with the sylvite in such a process. This is shown to be the case in Canadian Patent No. 525,305, wherein there is disclosed a method of recovering the carnallite collected with the sylvite flotation product.

Processes of beneficiating ores of the type hereinbefore mentioned encouter some difficulty for the reason that the ordinary potassium chloride of commerce (sylvite) is required to be at least 95% KCl in order to be accepted in commerce. This corresponds to a grade of approximately 60% $K_2O$. However, with the carnallite present in more than trace quantities, the concentrate grade is lowered below 60% $K_2O$ because of the fact that the carnallite mineral contains 1 mol of magnesium chloride and 6 mols of water for every mol of potassium chloride. It is not desired, today, to sell sylvite in industry if it contains an appreciable amount of carnallite. In any event, the final product should not contain carnallite in an amount greater than can be tolerated and still make a product having an overall 60% $K_2O$ content. Sylvite ores are presently available which are known to contain, in their natural state, carnallite ranging up to as high as 8 or even 12%. Perhaps other ores, as yet unlocated and unworked, can be found which have even greater quantities of carnallite. The mere removal of halite from such ores will not result in a potash concentrate of 60% $K_2O$ or greater. Hence, it is necessary to devise methods whereby the magnesium chloride content, as well as the halite content, does not appear to any appreciable extent in the final potash concentrates produced from these ores.

One method of accomplishing an appreciable recovery of potash (KCl) from sylvinite and carnallite is described in U.S. Patent No. 2,702,121, Colin et al., patented February 15, 1955, wherein the potassium losses are minimized by employing a conventional froth flotation of sylvite from sylvinite in a brine saturated with magnesium chloride values of the original carnallite. Such a brine has the very high viscosity of about 8.7 centipoises measured at 15° C. The brine is maintained, at all times during flotation operations, saturated with respect to magnesium under the prevailing conditions.

By so doing, brine losses from removal of clay and schist from the flotation brine circuit, although representing a lesser loss of potash values than if the brine contained less than saturation amounts of magnesium, results in a final potash concentrate contaminated with greater amounts of magnesium due to the relative commercial impossibility of displacement water washing of the potash concentrate efficiently. It is thus difficult to recover a potash concentrate of at least 60% $K_2O$ grade. Furthermore, the above-mentioned brine losses are made up by the addition of water and, to the extent of the brine losses, in sufficient quantities to reach magnesium saturation.

It is an object of the present invention to pretreat carnallite-containing sylvite ores so as to produce a solid phase material which can be beneficiated by conventional methods.

It is a further object of the invention to produce a commercially saleable sylvite concentrate from carnallite-containing sylvite ores wherein the ores originally contained greater quantities of carnallite than can be tolerated in the sylvite concentrate and still be commercially marketable.

It is a further object of the invention to devise a novel process that is cheap and efficient for the effective removal of magnesium in the form of a water solution of magnesium chloride from a system involving the wet beneficiation of carnallite-containing sylvite ores wherein the said ores contain minor but significant amounts of carnallite.

It is a still further object of the invention to discard magnesium-containing brine from a system involving the beneficiation of carnallite-containing sylvite ore, and with the discarding of a portion of the brine to reduce the total magnesium inventory of the brine system, while at the same time discarding as little of the potassium chloride of the brine as is practical and producing a potash concentrate of high purity and of substantially low magnesium content.

It is a still further object of the invention to provide a beneficiation process for sylvite ore associated with carnallite in order to recover a granular or finely divided sylvite concentrate of commercial grade, whilst achieving high recovery of the potash values contained in the ore.

It is a further object of the invention recover as a saleable concentrate, a portion of the KCl originally present in the carnallite contained in the feed.

Other objects will be apparent upon a more complete understanding of the novel process as hereinafter more fully described.

The instant novel process, in essence, comprises a pretreatment of the carnallite-containing sylvite ore with a previously formed brine of NaCl, KCl and water, wherein the magnesium content of the brine is less than the equilibrium or saturation quantity possible under the conditions prevailing. The liberated ore is treated, preferably, countercurrently, with this aqueous brine which is essentially unsaturated with respect to its possible saturated magnesium content. A countercurrent leaching with such a brine effectively separates the magnesium of the carnallite entering the circuit at a point ahead of the flotation or other benefication processes for the KCl. For example, a system maintained at 15–20° C. or thereabouts, if permitted to attain equilibrium with respect to a sylvinite-containing carnallite will result in a liquid phase (brine) containing about 6.6% magnesium, and will have a viscosity of about 8.7 centipoises measured at 15° C. Subsequent benefication by wet methods (froth flotation) of the solid phase NaCl and KCl, see Colin et al. U.S. Patent No. 2,702,121, is difficult because the liquid phase has such a high viscosity that it is difficult to pump slurry or brine, it is difficult to process slurry through flotation mechanisms and, more important still, it is difficult to rid filter cakes or centrifuge cakes of residual quantities of magnesium-containing brine, as hereinbefore pointed out. Accordingly, the novel system herein set forth operates, particularly in the pretreatment steps, with a brine containing substantially less than 6.6% magnesium, or less than saturation with respect to magnesium under the temperature conditions used. For example, a Canadian sylvite ore containing up to 10 or 12% carnallite is mined and crushed to −10 mesh with 90% being retained on a 100 mesh screen. A brine prepared by dissolving KCl and NaCl in water, and adjusting its magnesium content to about 1.5% at equilibrium conditions, is used to slurry the comminuted ore to the extent that the slurry contains about 88% solids. Additionally, an aqueous brine, also saturated with respect to NaCl and KCl, containing about 3.5% magnesium, having a viscosity of about 4.5 centipoises measured at 15° C., is added to the raw ore and the 1.5% magnesium (3.8 centipoises viscosity measured at 15° C.) brine in sufficient amount so that a slurry containing about 75% solids is obtained. This is for the purpose of effecting better contact between the liquid and solid phases. The admixture of the 2 brines and the ore is agitated for between about 2 and about 5 minutes in order to effect intimate contact of the liquid with the solids. The degree of unsaturation of the brines used, with respect to magnesium, is varied in accordance with the amount of carnallite present in the ore so that after 2 to 5 minutes of agitation substantially all of the carnallite has reacted with the liquid phase, thus permitting the magnesium chloride content of the carnallite to go substantially completely into solution. The above brines, as described, are best suited for use with ores containing about 3 to 6%, preferably about 4%, carnallite. It is necessary for the successful operation of this process to always have present more than enough unsaturation in the brine, with respect to magnesium, contacting the carnallite of the ore so that all of the magnesium chloride of the carnallite will go in solution, while at the same time having a brine that is incapable of dissolving further substantial quantities of NaCl and KCl. Actually, because of the fact that the carnallite contains 6 mols of water, some additional quantities of NaCl and KCl would be dissolved due to the release of the 6 mols of water.

However, because of the fact that the brine which is used to contact the raw ore is saturated with respect to NaCl and KCl, and because of the fact that the solution of the magnesium chloride portion of the carnallite increases the magnesium concentration of the brine, portions of the NaCl and KCl dissolved in the brine being used, will be crystallized therefrom due to the increased concentration of magnesium. This results in a net increase in the solid content of the slurry. For example, if a feed containing 855 lbs. of KCl, 859 lbs. of NaCl, 14 lbs. of insolubles, and 72 lbs. of carnallite, giving a total of 1800 lbs., is contacted for about 5 minutes with 253 lbs of a 1.5% magnesium brine from the subsequent flotation circuit (saturated with respect to NaCl and KCl), and with 290 lbs. of a 3.5% magnesium recycled brine from the leaching circuit (saturated with respect to NaCl and KCl), the resultant slurry will contain in solid phase 875 lbs. KCl and 872 lbs. NaCl. The resultant brine or mother liquor will amount to 579 lbs. and will have a magnesium chloride content of about 79.2 lbs., although the original brines contained a total of 54½ lbs. of magnesium chloride.

The above figures, including the various concentrations of magnesium in the brines, are designed to work primarily in connection with ores containing about 4% carnallite. With ores containing about 8% carnallite, instead of using 1.5% magnesium brine in the flotation circuit, a 2.5% magnesium brine is used, and instead of using 3.5% magnesium brine in the feed leaching circuit, a 4.6% magnesium brine is used. Also, for example, in ores containing about 12% carnallite, brines used for flotation and pretreatment of the ore contain 3.0 and 5.7% of magnesium, respectively. The percentage of magnesium stated herein and in the claims with respect to the leaching circuit refers to the amount of magnesium, by weight, present in the brine upon completion of the leaching operation. The average magnesium concentration of the brine initially contacting the fresh ore (4% carnallite) will be somewhere between 1.5 and 3.5%, depending upon the relative amounts of the two brines used.

All of the above statements with respect to magnesium concentration of brines and the various amounts of carnallite in the raw ore are useful when the system operates at a temperature of about 15° C. The present process, however, is flexible and is designed to operate at any atmospheric temperature normally encountered. In general, the principles employed can be stated as follows:

The colder the brine is, the lower the magnesium concentration attainable, therefore, more brine of the specified above concentration must be used in order to remove the same amount of magnesium chloride from the carnallite; conversely, if the brine circuit is operating at a temperature above 15° C. less brine is required to accomplish the same amount of dissolution of magnesium chloride in the carnallite treated.

Ordinarily, 2 to 5 minutes of agitation time is sufficient to effect a complete dissolution of the carnallite. However, under some conditions, for example, a deficiency of brine or a coarse mesh size of the comminuted ore being treated, an agitation time up to as long as 10 minutes may be required in order to effect a complete dissolution of the carnallite. The correlation of the grind of the ore, the amount of brine used, its degree of magnesium unsaturation, etc., are all factors which must be taken into account in determining the proper time for agitating the ore with the brine to effect the complete dissolution of the carnallite contained in it.

The reacted slurry, after the 2 to 10 minutes of agitation, is subjected to a separation operation, which may be a filter or centrifuge type of treatment, in order to rid the solids of liquid phase. The solids so separated are then washed with water for two purposes: first, to rid the solids of as much magnesium associated with the liquid as possible and, secondly, to provide dilution of the brine down to the point where the brine in the solids coming from the filter is reduced to about 1.5% magnesium. Not all of the water to accomplish this dilution need be added at this point, but any water added will aid in approaching the 1.5% magnesium concentration of the brine used in subsequent treatment. A brine stable to the solid phases present during subsequent physical methods of separation is essential. Water added at the various points, for example, in a flotation circuit, for the purpose of washing cakes, controlling slurry density, etc., must always be such as to maintain a stable brine because an unstable brine will result in the solution of additional quantities of NaCl and KCl, or, if used in the head end of the circuit for the purpose of initially contacting the raw ore, will dissolve not only carnallite, but NaCl and KCl as well. This is to be avoided in so far as possible. The counter-current leaching of raw ore is designed to overcome these objections and provide a method of controlling the magnesium concentration in the subsequent brine circuit.

The liquid effluent from the liquid-solid separation is further processed in one of three ways, or in a combination of these three ways. A portion of the 3.5% magnesium brine may be bled from the circuit permanently and further processed to recover its dissolved solids content, if desired, or, it may be introduced into the subsequent circuit to maintain the stable brine at 1.5% magnesium to compensate for water added at various points in the flotation section and to maintain the brine inventory. This brine may also be recycled to adjust pulp density in the carnallite solution step as previously described. Ordinarily, approximately ⅓ to ½ of the total of the brine is recycled for treatment with the raw ore with a large part of the remainder of the brine being sent to waste.

The maintenance of the required differential relationship of the magnesium concentration in the final leach liquor, after use, versus the magnesium concentration in the brine employed in the sylvinite beneficiation operation, is important. Ordinarily, the final leach liquor, after use, should approach saturation with respect to magnesium concentration in order to minimize KCl dissolution, but regardless of this concentration, the magnesium concentration of the brine in the beneficiation circuit should always be at least 1.5% and preferably 2.0 to 2.7%, less than the leach circuit final liquor magnesium concentration. Stated by another correlation method, the final leach liquor after dissolving the carnallite will have a viscosity of from about 4.5 to about 6.0 centipoises measured at 15° C., while the beneficiation circuit brine will have a viscosity of less than 4.5 centipoises measured at 15° C., both brines being substantially saturated with respect to NaCl and KCl and with the differential viscosities being solely attributable to the differences in magnesium content. The viscosities between the liquids of the two circuits will differ from each other by from about 0.7 to about 1.7 centipoises, the highest differential figure being usual when the fresh sylvite ore feed contains the higher percentages of carnallite.

Referring now to the accompanying drawing, which represents a schematic flow sheet of a process designed for pretreating sylvinite containing about 5% carnallite followed by froth flotation of the halite-sylvite solids cake in order to secure a potassium chloride concentrate and sodium chloride tails, the process may be described as follows:

The ore, suitably sized to liberate its mineral components, is introduced into the agitator-reactor 3 by means of line 2 where it is contacted with the requisite quantities of 1.5% magnesium brine from line 37 and with 3.5% magnesium brine through line 7. The slurry, after retention time in reactor 3 of between about 2 and about 10 minutes, passes by means of line 4 to filter 5 where the reaction liquor is removed by means of line 7. The cake is washed with water from line 6a or by means of line 6 with a 1.5% magnesium brine in the form of a displacement wash, and the moist cake containing the fresh water and residual quantities of magnesium brine is conducted by means of line 10 to conditioner 11. The amount of displacement wash water introduced by means of line 6a is just sufficient so that upon mixing with the residual quantity of 3.5% magnesium brine it will give a final brine in that cake of about 1.5% magnesium content. This is necessary in order not to alter the magnesium concentration of the brine in the flotation circuit. Excess 3.5% magnesium brine is discarded from the system through line 8. The required amount of recycle brine is, of course, introduced to agitator 3 by means of line 7. In the event that fresh water is introduced into the brine of the flotation circuit, the adjustment of that diluted brine back to a 1.5% magnesium is accomplished by bleeding the required amount of 3.5% magnesium brine into the flotation circuit by means of line 9 into tailing thickener 33.

A previously prepared solution of starch in 1.5% magnesium brine is introduced by means of line 14 to conditioner 11 in order to control the slimes inherently present in the raw ore. Also, sufficient recycle flotation circuit brine is introduced into conditioner 11 by means of line 12 so that during the conditioning of the ore with starch, the slurry contains about 70-75% solids. The starch-conditioned ore is then passed by means of line 16 into a reagent conditioner 17 where it is agitated with reagent introduced by means of line 18. The amine reagent is the conventional long chain amine hydrochloride or acetate produced from the long chain fatty acids and is added to the extent of about 0.5-1.0 lb. of amine per ton of solids contained in the slurry. After thorough conditioning, which usually takes about 2 minutes, the conditioned reagentized slurry is passed by means of line 19 to feed tank 20 where additional quantities of 1.5% magnesium brine are introduced by means of line 21 so as to give a solids density of about 24-28% in the slurry which goes as feed to conventional type flotation cells. The conditioned and slurried material is introduced by means of line 23 into respective flotation cells 24 and 24a, connected in series and representing a plurality of cells, with the feed being introduced into the first cell at the head end of the system and allowed to flow, by series, through the bank of cells to the last one, represented by 24a. The float concentrate removed by means of line 25a is comprised of finely divided potash particles and some finely divided salt. The concentrate overflow from the tail end of the respective bank of cells, represented by 24a, has a higher percentage of coarse potash particles because of the fact that it takes longer for large potash particles to come to the liquid surface where they can be removed from the cells. The coarser fraction is shown as being removed from the respective banks by means of line 25. This fraction, which contains the coarse potash particles, is subjected to a wet screening operation in which the finely divided potash particles having a mesh size finer than 28 are removed from the screening operation 39 and recycled to the head end of the flotation system by means of line 44. The sizing need not be −28 mesh, but may be coarser to where the split takes place down to 12 mesh. The initially produced potash concentrate is introduced by means of line 25a into cleaner flotation cell 38 where the overflow concentrate is removed by means of line 41 and the middlings, or tailings, from this particular bank of cells are combined by means of line 40 with the coarser product from 24a in line 25 and subjected to the wet screening operation 39. By such a process the grade of the potash concentrate ultimately recovered can be improved. On the other hand, if grade is not important for recovering a cleaner product, a single bank of flotation cells 24 and 24a may have a concentrate comprised, as for example, by means of optional process flow line 43. In any event, the concentrates are separated by a centrifuge recycle separator, or the like, in steps 27 and/or 27a, and regular product is removed by line 29a, or granular potash product is removed by means of line 29. The brine underflow from the solids separation or filtrate is recycled to slurry feed tank 20 by means of lines 28, 28a and 21.

The sodium chloride tailings slurry is conducted by means of line 26 to solids separation step 30, the solids withdrawn from the system as tailings by means of line 32 and the brine filtrate withdrawn from the solids separation step 30 by means of line 31 and thus conducted to thickener 33. The underflow from thickener 33 is conducted by means of line 35 back to the solids separation step 30, while the overflow from thickener 33, which comprises essentially clear 1.5% magnesium brine, is usually introduced into a brine circuit storage tank (not shown) from which, by means of line 34, it is returned to the system at the various points where brine additions are shown to be desirable. For example, it is returned to slurry feed tank 20 by means of lines 34, 22, and 21; it is returned to initial starch conditioner 11 by means of lines 34, 36, and 12, and it is returned to the initial carnallite agitator-reactor 3, as required, by means of lines 34, 36, and 37; or it is returned to the filter 5 to serve as a displacement brine wash by means of lines 34, 36, 6 and 6a. Alternatively, the discharge from agitator 3 may be introduced into a thickener or hydrocyclone (not shown) and a portion of the brine overflow from this, which will be about 3.5% magnesium, is sent to waste through line 8. The underflow from the thickener or hydrocyclone is then introductd into filter 5 by means of line 4 and a portion of the overflow from the cyclone would be sent to waste through line 8. The rest of the underflow would go to line 7 for recycle.

A raw ore containing about 45% KCl, about 50% sodium chloride, about 4% carnallite, and the remainder insolubles, by following the process as outlined in the drawing, will give a potassium chloride concentrate of about 61.5% $K_2O$, with a recovery of about 95%. This corresponds to a commercial grade of potash averaging about 97.5% KCl with the balance being largely NaCl.

It will be recognized, of course, that many modifications or variations of this process can be accomplished without departing from the essence of the invention herein described. Thus, for example, instead of using amine reagents at line 18 and conditioning the ore with amine reagents in conditioner 17, the process is equally operable if reagents having an affinity for sodium chloride instead of potassium chloride are employed at line 18 and in conditioner 17. Such reagents are described in the Weinig Patent No. 2,222,332, of November 19, 1940. By employing the techniques therein disclosed, the sodium chloride will float and the potassium chloride will be withdrawn from the bottom of the flotation cells. A representative patent showing the use of amine reagents and starch is Tartaron et al., No. 2,288,497, June 30, 1942.

As illustrative of a method whereby the process of preleaching, countercurrently, the carnallite from the circuit containing sylvinite, followed by the froth flotation of the resultant solids to produce a potash concentration, the following examples are given. The quantities of ore, brine, cakes, etc., given in the following examples are on the basis of pounds per 24-hour day, the plant being operated on a continuous basis. It will be appreciated however, that these figures can all be multiplied by any desired factor, depending on the size of the plant to be operated.

*Example I*

1800 lbs. of a carnallite-containing sylvinite ore having a composition as hereinbefore stated, is treated with 253 lbs. of 1.5% magnesium brine saturated at ambient temperature with respect to sodium chloride and potassium chloride, and with 290 lbs. of 3.5% magnesium brine saturated with respect to sodium chloride and potassium chloride under the same temperature conditions. The admixture is tumbled and agitated for a period of about 3 minutes and the resultant slurry is filtered. The filtrate from this operation is available for recycle, waste, or use in the flotation circuit. Filter cake is then washed with 124 lbs. of fresh water which is not sufficient to completely displace the 3.5% magnesium brine contained in the cake, but is sufficient to reduce what brine there is left in the cake down to a concentration of about 1.5% magnesium content. The moist cake in the amount of 2020 lbs., containing 1710 lbs. of dry solids, is treated with a 2% starch solution in 1.5% magnesium brine in the amount of 23 lbs. and with 1.5% magnesium flotation circuit brine in the amount of about 260 lbs. This pulp is then agitated or conditioned for about 1 minute, after which there is added about 5 lbs. of a 5% amine aqueous solution prepared from the long chain fatty acids and being in the form of their water soluble HCl or acetate salts. These conventional compositions of commerce are produced by General Mills and Armour & Company and sold under various trade names. The conditioned slurry is adjusted with additional 1.5% magnesium flotation circuit brine so as to give a final slurry having about 27% solids.

A potassium chloride froth concentrate from the rougher froth flotation cells is subjected to a cleaner froth flotation operation and the final froth product is displacement washed with fresh water to yield a 61.5% $K_2O$ dry concentrate in the amount of about 829 lbs. with a recovery above 95%. Sodium chloride tailings are dewatered to recover the brine, given a water or brine displacement wash to recover additional brine and discarded.

*Example II*

The same process was carried out in exactly the same manner as set forth with respect to Example I, except the filter cake, instead of being washed with 124 lbs. of fresh water, was washed with 253 lbs. of a 1.5% magnesium brine which was saturated with respect to sodium chloride and potassium chloride at ambient temperatures. The effluent from the displacement wash was then recycled back to the initial brine treatment of the carnallite-containing sylvinite ore in order to dissolve the magnesium values contained in that ore. Essentially all of the 3.5% magnesium brine contained in the filter cake was removed by this wash. The moist cake in the amount of 2110 lbs. contained 1764 lbs. of dry solids and was then treated with a 2% starch solution in 1.5% magnesium brine in exactly the same manner as described in Example I. A slightly higher recovery of potash of about the same grade as in Example I was obtained.

This application is a continuation-in-part of copending application Serial No. 665,464, filed June 13, 1957, now abandoned, by Howard P. Clark and Albert Adams and entitled Potash Ore Treatment.

Having now thus fully described and illustrated the character of the invention, what is desired to be secured by Letters Patent is:

1. A process of beneficiating substantially liberated sylvinite ore containing carnallite, said carnallite being present in an amount of not more than 12% by weight, which comprises substantially completely removing the magnesium chloride content of said carnallite by leaching said ore with a magnesium chloride-containing brine substantially saturated with respect to sodium chloride and potassium chloride but at least sufficiently unsaturated with respect to magnesium chloride to obtain a viscosity below about 6.0 centipoises measured at 15° C. after said leaching, and subjecting the solids resultant from said leaching to froth flotation in a magnesium chloride-containing brine substantially saturated with respect to sodium chloride and potassium chloride but at least sufficiently unsaturated with respect to magnesium chloride to obtain a viscosity of less than 4.5 centipoises measured at 15° C. and lower than the viscosity of the brine from said leaching, and recovering a sylvite concentrate.

2. A process as in claim 1 in which said sylvinite ore contains carnallite in an amount between about 3% and about 12% by weight.

3. A process as in claim 1 in which the brine used in the froth flotation contains at least 1.5% by weight less magnesium than the brine used in the leaching.

4. A process as in claim 1 in which the brine from the leaching has a viscosity between about 4.5 and about 6.0 centipoises measured at 15° C.

5. A process as in claim 1 wherein the magnesium chloride content in the leaching is about 3.5%, and the magnesium chloride content in the froth flotation is about 1.5%, calculated in each case as percent by weight of elemental magnesium.

6. A process as in claim 1 wherein a long chain fatty acid amine acid addition salt is used in the froth flotation as the collecting agent for the sylvite values.

7. A process as in claim 1 in which a fine grade of sylvite concentrate is separately collected from a coarser grade sylvite concentrate, and in which the coarser sylvite concentrate is screened to a mesh split at 28 mesh with the —28 mesh being recycled to the froth flotation operation and the +28 mesh particles being recovered as granular product.

References Cited in the file of this patent

UNITED STATES PATENTS 2,702,121    Colin et al. _____ Feb. 15, 1955
2,721,657    Smith et al. _____ Oct. 25, 1955